(12) United States Patent
Chang et al.

(10) Patent No.: US 10,209,161 B2
(45) Date of Patent: Feb. 19, 2019

(54) MEASURING OPTICAL ELEMENT FOR ABERRATION FROM GRAVITY AND HOLDING

(71) Applicant: NATIONAL APPLIED RESEARCH LABORATORIES, Taipei (TW)

(72) Inventors: Shenq-Tsong Chang, Taipei (TW); Wei-Cheng Lin, Taipei (TW); Ting-Ming Huang, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 563 days.

(21) Appl. No.: 14/322,912

(22) Filed: Jul. 3, 2014

(65) Prior Publication Data

US 2016/0003706 A1 Jan. 7, 2016

(51) Int. Cl.
*G01M 11/02* (2006.01)
*G01M 11/00* (2006.01)

(52) U.S. Cl.
CPC ...... *G01M 11/0271* (2013.01); *G01M 11/005* (2013.01)

(58) Field of Classification Search
CPC .......... G01M 11/025; G01M 11/0214; G01M 11/0271; G01M 11/0235; G01B 9/0203; G01B 9/0209; G01B 9/02087
See application file for complete search history.

*Primary Examiner* — Hwa Andrew Lee
(74) *Attorney, Agent, or Firm* — Chih Feng Yeh; Huntington IP Consulting Co., Ltd.

(57) ABSTRACT

A measuring method for an optical element for obtaining a plurality of measurement errors of the optical element is disclosed, which comprises steps of irradiating a laser ray to an overall portion of the optical element, wherein the optical element is supported as one of a horizontal state and a vertical state; rotating continuously the optical element with 360 degrees to reflect the laser ray to obtain a reflected light wavefront picture from the reflected laser ray; analyzing the reflected light wavefront picture to obtain a plurality of aberration characteristics information, respectively, each being one of a sine and a cosine wave functions of a wavefront error for each of the plurality of specified rotation angles; analyzing a plurality of interference factors each for the plurality of measurement errors on each of the plurality of aberration characteristics information, respectively; calculating and extracting a plurality of classified aberration characteristics information for each of the plurality of specified rotation angles of the optical element from each of the plurality of aberration characteristics information according to the plurality of measurement errors, respectively; and analyzing each of the plurality of classified aberration characteristics information to obtain an error amount corresponding to each of the plurality of measurement errors, respectively.

10 Claims, 6 Drawing Sheets

MEASURING OPTICAL ELEMENT FOR ABERRATION FROM GRAVITY AND HOLDING

BACKGROUND OF RELATED ART

Technical Field

The present invention relates to an optical element measuring technology. More particularly, the present invention relates to a method, computer recordable media, system, and apparatus for obtaining a plurality of measurement errors of the optical element.

Related Art

An optical element has to be measured to make sure its performance after being finished with manufacture. The optical element may have an error as compared to what has been designed previously, and this error is called manufacture. Further, since the optical element is held on a measurement instrument in a measurement task, gravity of the optical element itself, a holding position and state may also result in errors. In addition, a system measurement error may occur on the combination of the optical element and the measurement instrument.

Typically, the measurement instrument is an interferometer or a wavefront sensor. The mentioned optical element may involve a convex lens, a concave lens, plane a mirror, aspherical concave, an aspherical concave, and the like. The mentioned errors may result in various forms of aberration, including several orders of spherical aberration, astigmatism, coma, trefoil, tetrafoil, and pentafoil aberrations. Each of the aberrations of several orders is a Zernike coefficient, and all the Zernike coefficients add together to from a Zernike polynomial, which presents a measurement result of the optical element. Such Zernike coefficients are provided in the conventional interferometer or wavefront sensor, which also provides a wavefront picture corresponding to the various levels of Zernike coefficients. In addition, the interferometer or wavefront sensor also provides an interference picture.

The above errors have a larger effect on performance of the optical elements having a larger diameter or precision. In addition, the gravity error of the optical element has a different value when the optical element is used in space. Generally, the optical elements are apt to have an affected measurement result owing to the holding and supporting means in the measuring task, and this error associated with the holding and supporting of the optical element presents an additional error to the optical element although the optical element has been polished and corrected according to the measurement result. Therefore, it is apparently quite a need to have an absolute measurement technology for optical elements.

Hence, the prior art absolute measuring technology cannot effectively separate the deformities contributed from the holding and gravity of the optical element, i.e. the Zernike coefficients contributed from the same cannot be understood and thus separated. Further, the improved means for the inaccurate measurement is applied for the most part, only with consideration of the gravity factor. At this time, the optical element is rotated 360 degrees, the interferometer or wavefront sensor emits a light ray to project on the optical element, and a light picture of a reflected version of the projected light ray are acquired. Further, the measurement data, i.e. wavefront error data with respect to a plurality of angles among the 360 degrees are averaged, and the averaged data are taken as a final wavefront error data. The angles for sample data taking are 0 degree and 360 degrees, or 0 degree, 90 degrees, 360 degrees, and 270 degrees.

However, this measurement result obtained by the prior measurement technology might not have a desired precision, and the other factors resulting in the measurement errors still have to be separated so as to have a more precise measurement result, simultaneously the polish process for the optical element manufacture may have a more correct basis. Therefore, there is quite a need to set forth an improved absolute measuring technology for optical elements.

In addition, the prior optical element measuring technology involves a use of an octal-axis adjustment mechanism and a complicated apparatus alignment process therefor. Therefore, the prior optical element measuring technology still has a space to improve for simplification.

SUMMARY

In view of the above, it is an object of the present invention to set forth a method, a computer recordable media, system and apparatus for measuring an optical element, so that an error amount of various measurement errors associated with the optical amount may be measured.

According to the present invention, the measuring method for an optical element for obtaining a plurality of measurement errors of the optical element, comprising steps of (a) irradiating a laser ray to an overall portion of the optical element, wherein the optical element is supported as one of a horizontal state and a vertical state; (b) rotating continuously the optical element with 360 degrees to reflect the laser ray to obtain a reflected light wavefront picture from the reflected laser ray for each of a plurality of specified rotation angles of the optical element; (c) analyzing the reflected light wavefront picture for each of a plurality of specified rotation angles of the optical element to obtain a plurality of aberration characteristics information, respectively, each being one of a sine and a cosine wave functions of a wavefront error for each of the plurality of specified rotation angles of the optical element; (d) analyzing a plurality of interference factors each for the plurality of measurement errors on each of the plurality of aberration characteristics information, respectively, for each of the plurality of specified rotation angles of the optical element; (e) calculating and extracting a plurality of classified aberration characteristics information for each of the plurality of specified rotation angles of the optical element from each of the plurality of aberration characteristics information according to the plurality of measurement errors, respectively, for each of the plurality of specified rotation angles of the optical element; and (f) analyzing each of the plurality of classified aberration characteristics information for each of the plurality of specified rotation angles of the optical element to obtain an error amount corresponding to each of the plurality of measurement errors, respectively.

According to the present invention, the computer recordable media used for executing a method for measuring an optical element for obtaining a plurality of measurement errors of the optical element, comprising steps of (a) irradiating a laser ray to an overall portion of the optical element, wherein the optical element is supported as one of a horizontal state and a vertical state; (b) rotating continuously the optical element with 360 degrees to reflect the laser ray to obtain a reflected light wavefront picture from the reflected laser ray for each of a plurality of specified rotation angles of the optical element; (c) analyzing the reflected light wavefront picture for each of a plurality of specified rotation angles of the optical element to obtain a plurality of aberration characteristics information, respectively, each being one of a sine and a cosine wave functions of a wavefront error for each of the plurality of specified rotation angles of the optical element; (d) analyzing a plurality of interference factors each for the plurality of measurement errors on each of the plurality of aberration characteristics information, respectively, for each of the plurality of specified rotation angles of the optical element; (e) calculating and extracting a plurality of classified aberration characteristics information for each of the plurality of specified rotation angles of the optical element from each of the plurality of aberration characteristics information according to the plurality of measurement errors, respectively, for each of the plurality of specified rotation angles of the optical element; and (f) analyzing each of the plurality of classified aberration characteristics information for each of the plurality of specified rotation angles of the optical element to obtain an error amount corresponding to each of the plurality of measurement errors, respectively.

According to the present invention, the system for measuring an optical element for obtaining a plurality of measurement errors of the optical element, comprising: a rotation/holding module, irradiating a laser ray to an overall portion of the optical element, wherein the optical element is supported as one of a horizontal state and a vertical state; a picture capturing module rotating continuously the optical element with 360 degrees to reflect the laser ray to obtain a reflected light wavefront picture from the reflected laser ray for each of a plurality of specified rotation angles of the optical element; a characteristics analysis module, analyzing the reflected light wavefront picture for each of a plurality of specified rotation angles of the optical element to obtain a plurality of aberration characteristics information, respectively, each being one of a sine and a cosine wave functions of a wavefront error for each of the plurality of specified rotation angles of the optical element; an error analysis module, analyzing a plurality of interference factors each for the plurality of measurement errors on each of the plurality of aberration characteristics information, respectively, for each of the plurality of specified rotation angles of the optical element; an error classified-characteristics obtaining module, calculating and extracting a plurality of classified aberration characteristics information for each of the plurality of specified rotation angles of the optical element from each of the plurality of aberration characteristics information according to the plurality of measurement errors, respectively, for each of the plurality of specified rotation angles of the optical element; and an error amount calculation module, analyzing each of the plurality of classified aberration characteristics information for each of the plurality of specified rotation angles of the optical element to obtain an error amount corresponding to each of the plurality of measurement errors, respectively.

According to the present invention, the apparatus for measuring an optical element for obtaining a plurality of measurement errors of the optical element, comprising a rotation/absorption module, comprising an absorption unit, absorbing the optical element; a rotation unit, rotating the absorbed optical element; and a movement transmission unit, being a transmission rod mechanism, having an initial position, and used for bringing the absorption unit from the initial position to a position above the optical element to absorb the optical element and going back to the initial position; and a supporting/positioning module, comprising a positioning unit, confining a position deviation of the optical element for a repeated placement of the optical element from an external environment; and a supporting/holding unit, supporting and fixing the optical element, the optical element being supported as one of a horizontal state and a vertical state; a measurement module, comprising a light source provision unit, emitting a laser ray; a posture adjustment unit, adjusting a posture of the measurement module; and a picture capturing unit, capturing a plurality of wavefront picture information from a reflected version of the laser ray, for a plurality of specific rotation angles of the optic element; and an error calculation module, comprising a characteristics obtaining unit, analyzing a plurality of aberration characteristics information for each of the plurality of wavefront picture information, respectively, for the plurality of specific rotation angles of the optic element, each of the plurality of aberration characteristics information being one of a sine or cosine wave; and an error analysis unit, analyzing a plurality of interference factors corresponding to one of the plurality of measurement errors on each of the aberration characteristics information, respectively, for the plurality of specific rotation angles of the optic element; a classified characteristics obtaining unit, calculating and extracting a plurality of classified aberration characteristics information from each of the plurality of aberration characteristics information according to the plurality of measurement errors, respectively, for each of the plurality of specified rotation angles of the optical element; and an error amount calculation unit, analyzing each of the plurality of classified aberration characteristics information for each of the plurality of specified rotation angles of the optical element to obtain an error amount corresponding to each of the plurality of measurement errors, respectively.

By means of the method, computer executable recordable media, system, and apparatus for measuring an optical element, a holding error, an optical element gravity and a system error may be effectively separated and obtained, which may be then used to serve as a superior reference for a subsequent polishing and correction process of the optical element. This is an advantage of the present invention over the prior art.

BRIEF DESCRIPTION OF THE DRAWINGS

The present invention will be better understood from the following detailed descriptions of the preferred embodiments according to the present invention, taken in conjunction with the accompanying drawings, in which.

DETAILED DESCRIPTION

The present invention will be apparent from the following detailed description, which proceeds with reference to the accompanying drawings, wherein the same references relate to the same elements.

The present invention discloses a method, computer readable storage media, system, and apparatus for measuring an optic element.

Figure 1A:
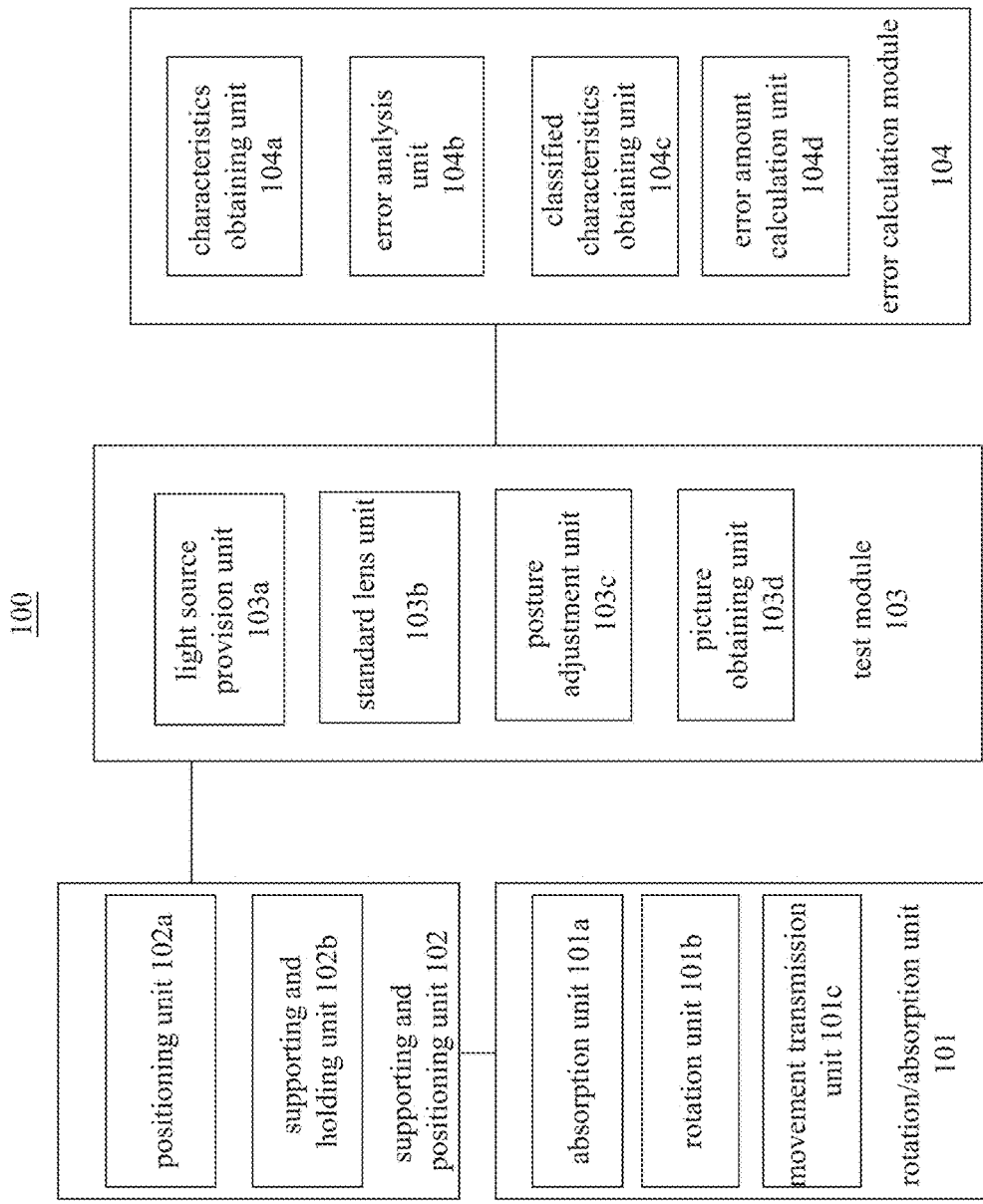
FIG. 1A is a systematic block diagram of an apparatus for measuring an optical element according to the present invention.
Figure 1B:
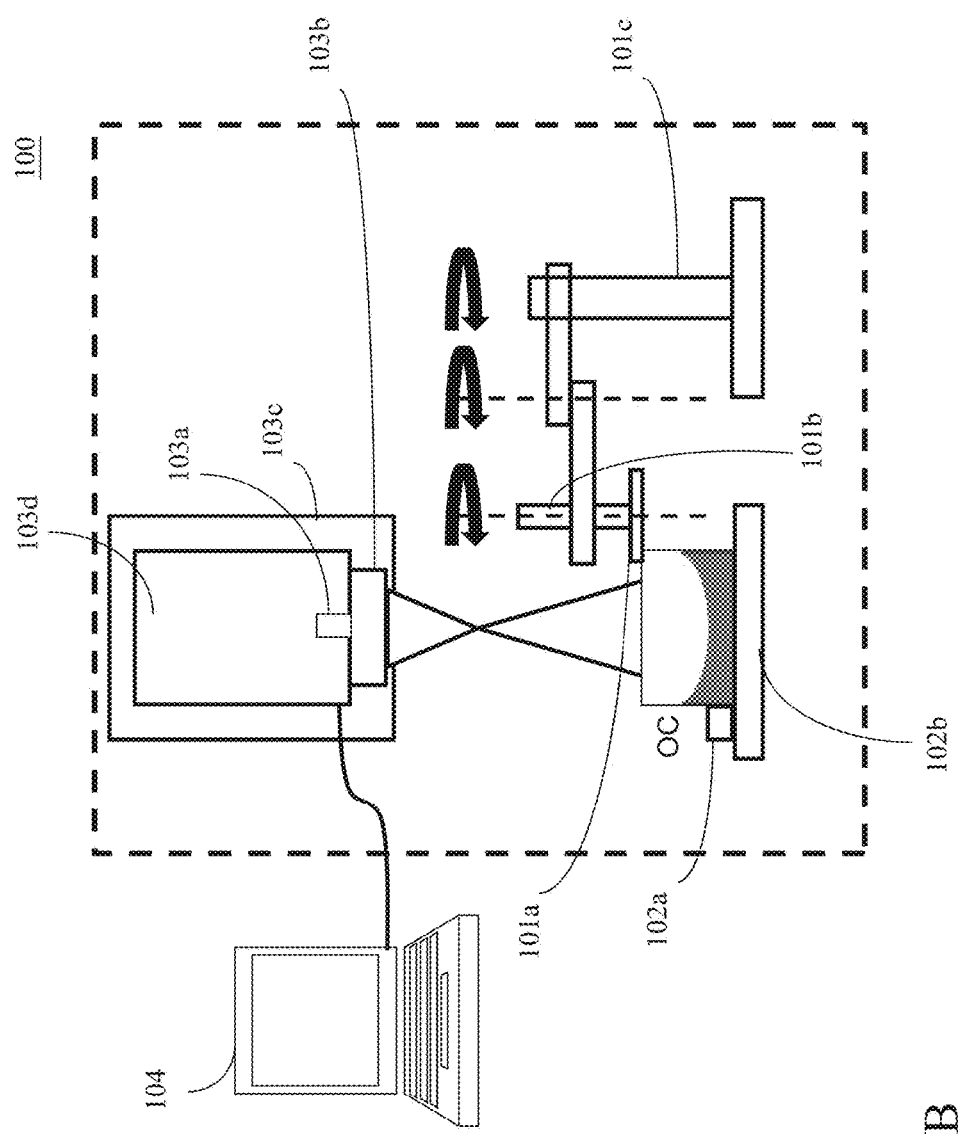
FIG. 1B is an architecture diagram of the apparatus for measuring an optical element shown in FIG. 1A according to the present invention.

At first, referring first to FIG. 1A, a schematic block diagram of an apparatus for measuring an optic element according to the present invention is shown therein. Concurrently, referring to FIG. 1B, which is a schematic architecture diagram of the apparatus for measuring an optic element according to the present invention.

As shown, the apparatus 100 comprises a rotation absorption module 101, a supporting/positioning module 102, a measurement module 103, and an error calculation module 104.

The rotation absorption module 101 comprises an absorption unit 101a, a rotation unit 101b, and a movement transmission unit 101c.

The absorption unit 101a is used to absorb the optic element OC, and the rotation unit 101b is used to rotate the absorbed optic element OC. The movement transmission unit 101c is a rod transmission unit 101c, having an initial position, is used for bringing the absorption unit 101a from the initial position to a position above the optical element OC to absorb the optical element OC and going back to the initial position.

The supporting/positioning module 102 comprises a positioning unit 102a and a supporting and holding unit 102b. The supporting/positioning unit 102a is used to confine a position deviation of the optical element OC for a repeated placement of the optical element from an external environment. In operation, the measured optic element OC is placed on the supporting/holding unit 102b, so that the optic element OC may be supported and fixed. In addition, the optical element OC is supported as a horizontal state or a vertical state. Further, the supporting mechanism may be a three-point support, a face-type support, a multiple-point support, or a vacuum absorption support. In addition, the optic element OC may be a convex or a concave, without limiting the present invention.

The measurement module 103 comprises a light source provision unit 103a, a posture adjusting unit 103c, and a picture capturing unit 103d. The light source provision unit 103a is used to emit a laser ray. The standard lens unit 103b is used to adjust the laser ray, so that the laser ray may cover an entirety of the optic element OC. The posture adjustment unit 103c is used to adjust a posture of the measurement module 103, and may be a pentagon-axis adjustment system, which may provide an automatic or manual adjustment mechanism. The picture capturing unit 103d is used to capture a plurality of wavefront picture information constituted by a reflected version of the laser ray from the optic element OC. In a preferred embodiment, the wavefront picture information has twelve sets.

The error calculation module 104 comprises a characteristics obtaining unit 104a, an error analysis unit 104b, a classification feature obtaining unit 104c, and an error amount calculation unit 104d. The characteristics obtaining unit 104a is used to analyze a plurality of aberration characteristics information for each of the plurality of wavefront picture information, respectively, wherein each of the plurality of aberration characteristics information is a sine or a cosine wave.

The error analysis module 104b is used to analyze a plurality of interference factors each for the plurality of measurement errors on each of the plurality of aberration characteristics information, respectively. The error classified-characteristics obtaining module 104c is sued to calculate and extract a plurality of classified aberration characteristics information for each of the plurality of specified rotation angles of the optical element from each of the plurality of aberration characteristics information according to the plurality of measurement errors, respectively. The error amount calculation module 104d is used to analyze each of the plurality of classified aberration characteristics information for each of the plurality of specified rotation angles of the optical element to obtain an error amount corresponding to each of the plurality of measurement errors, respectively.

The reflected laser ray has a picture, and comprises a wavefront picture information. The picture capturing unit 103d captures a wavefront picture information for some particular rotation angles of the optic element OC, and for twelve rotation angles of the optic element OC in a preferred embodiment.

Thereafter, the characteristics obtaining unit 104c calculates a plurality of aberration characteristics information, i.e. several levels of Zernike coefficients, for the reflected laser ray wavefront pictures for each of the rotation angles of the optic element OC. And, each Zernike coefficient information is represented as a function plot with the wavefront error vs. the rotation angle, and which is a sine wave or a cosine having a particular period. However, this is not the case in the prior art where only the Zernike coefficients are provided. That is, the Zernike coefficients are further converted into the function plot with the wavefront error vs. the rotation angle in the present invention, and the function plot is termed as "aberration characteristics information" in this specification.

The error calculation module 104 is used to analyze various types of error and an error amount of these error types. The errors includes a measuring system error, an optic element gravity error, a holding error, and a manufacture residual-shape error.

The error analysis unit 104b is used to analyze a plurality of interference factors each for the plurality of measurement errors on each of the plurality of aberration characteristics information, respectively. This analysis is performed by comparing each of the Zernike coefficient function plots, i.e. the plurality of aberration characteristics information, with an ideal sine function and an ideal cosine function to obtain an amplitude difference and a constant amplitude deviation for each of the plurality of specified rotation angles of the optic element, respectively, wherein the amplitude difference and the constant amplitude deviation indicates one or more interference factors. As to the analysis and determination of the error analysis unit 104b for the interference factors and measurement errors, they will be described in the following context.

The error classified-characteristics obtaining unit 104c is used to calculate and extract a plurality of classified aberration characteristics information for each of the plurality of specified rotation angles of the optical element from each of the plurality of aberration characteristics information according to the plurality of measurement errors, respectively. That is, when all the measurement errors are analyzed and thus obtained, the Zernike coefficients corresponding thereto are all analyzed and thus obtained, which is termed as "classified aberration characteristics information".

The error amount calculation unit 104d is used to analyze each of the plurality of classified aberration characteristics information, to obtain an error amount corresponding to each of the plurality of measurement errors, respectively. This analysis is performed by determining the plurality of error amounts by reading out the amplitude difference on each of the plurality of classified aberration characteristics.

This amplitude difference is the wavefront error, e.g. the error amount as mentioned in the present invention.

In addition, the standard lens module 103b may be arranged with a computer generated hologram (CGH) and a null lens, in the case that the optical element is an aspherical surface (not shown).

By using the present invention, the apparatus for measuring an optical element does not need an octave-axis adjustment mechanism and a complicated machine alignment process. In addition, there is no any apparatus calibration process required before a measurement task, since the overall system measurement error may be readily recognized owing to its identification as a constant amplitude in the aberration characteristics information. This may be appreciated by referring to the later description.

Figure 2:
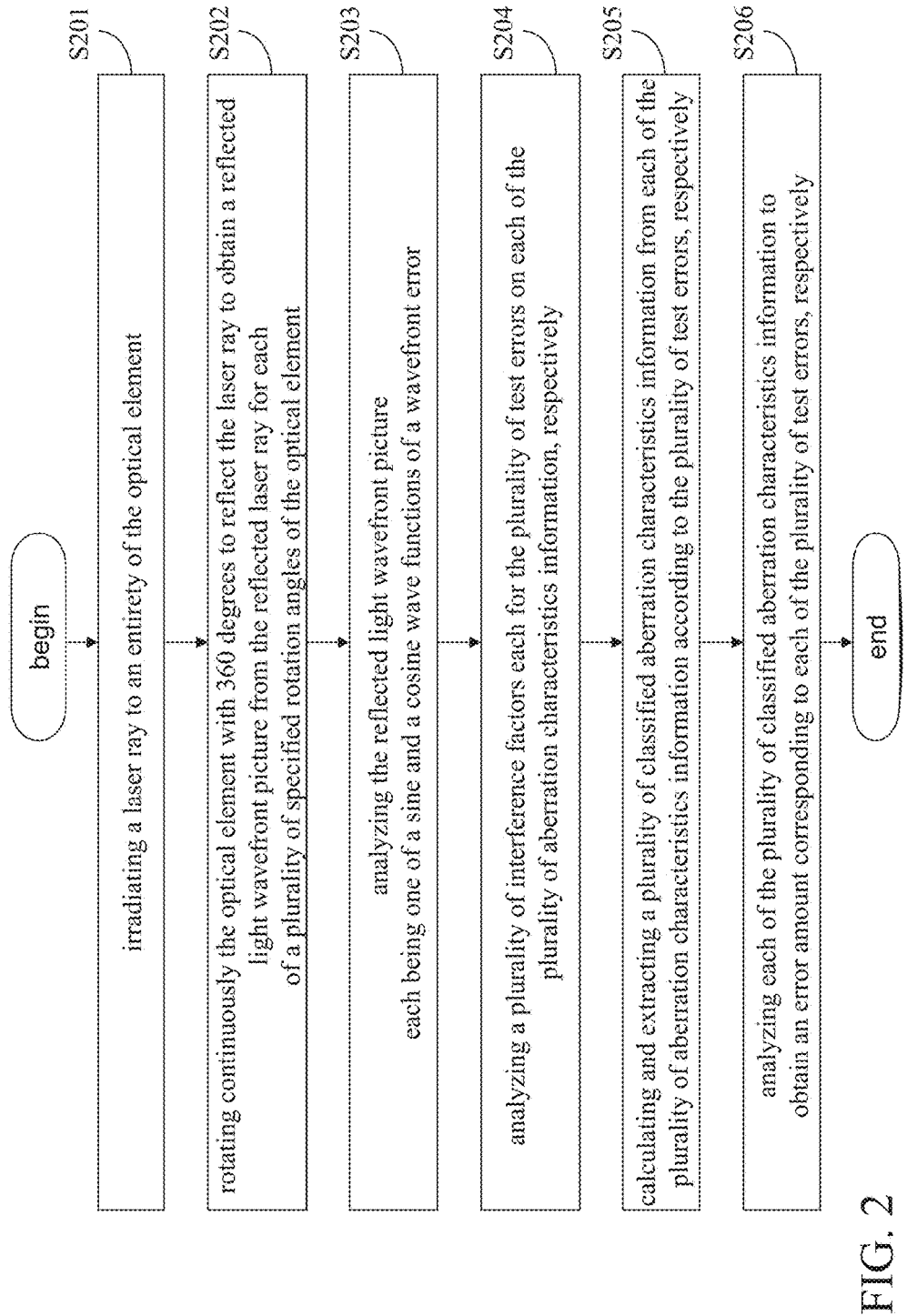
FIG. 2 is a flowchart illustrating a method for measuring an optical element.

Thereafter, referring FIG. 2, which is a flowchart of a method for measuring an optic element according to the present invention, and the method will be described as follows.

At first, a laser ray is irradiated to an entirety of the optical element (S201), wherein the optical element is supported as a horizontal state or a vertical state. Next, the optical element with 360 degrees is rotated continuously to reflect the laser ray to obtain a reflected light wavefront picture from the reflected laser ray for each of a plurality of specified rotation angles of the optical element (S202). In the following, the steps S203 to S206 are all performed for all the specified rotation angles of the optic element. Then, the reflected light wavefront picture for each of a plurality of specified rotation angles of the optical element is analyzed to obtain a plurality of aberration characteristics information, respectively (S203), wherein each of the aberration characteristics information is a sine or a cosine wave functions of a wavefront error. Subsequently, a plurality of interference factors each for the plurality of measurement errors on each of the plurality of aberration characteristics information, respectively, are analyzed (S204). Thereafter, a plurality of classified aberration characteristics information extracted from each of the plurality of aberration characteristics information according to the plurality of measurement errors, respectively, are analyzed (S205). Finally, each of the plurality of classified aberration characteristics information is analyzed to obtain an error amount corresponding to each of the plurality of measurement errors, respectively (S206).

The description above made for the method steps has been presented generally in cooperation with the description made for the apparatus 100 of the present invention.

As also mentioned above, the plurality of aberration characteristics information are various levels of Zernike coefficients, and are each a sine or cosine wave having a particular period for a relationship of the wavefront error and the rotation angles of the optic element. The Step S204 is performed by the following manners.

At first, each of the plurality of aberration characteristics information is compared with an ideal sine function and an ideal cosine function to obtain an amplitude difference and a constant amplitude deviation, respectively, wherein the amplitude difference and the constant amplitude deviation indicates at least one of the plurality of interference factors. If the optical element is an axial symmetric element, and if a supporting and holding unit 102b for supporting and holding the optical element is fixed stationary with respect to a rotation of the optical element, and if each of the aberration characteristics information has the constant amplitude deviation independent on one of the plurality of specified rotation angles corresponding thereto, the constant amplitude deviation is determined as a sum of an overall measurement system error, a holding error, and an optical element gravity error among the plurality of measurement errors.

Further, if the supporting and holding unit rotates with the supporting and holding unit, and if the aberration characteristics information has a constant amplitude deviation independent on one of the plurality of specified rotation angles corresponding thereto, the amplitude difference is determined as being contributed from the overall measurement system error and the optical element and the optical element gravity error. And if a sine wave or a cosine wave having a period, e.g. 120 degrees, equivalent to a plurality of holding angles, e.g. 0 degree, 120 degrees, and 240 degrees, of the holding unit holding the optical element exists in the ideal sine function and the ideal cosine function, the amplitude difference of the period of the sine wave or cosine wave is determined as being resulted from a holding error owing to the holding unit. Then, the amplitude differences resulted from the holding error, the optical element gravity error, and the overall system measurement error from each of the plurality of aberration characteristics information is deducted, and the amplitude difference of a remaining portion of each of the plurality of aberration characteristics information associated with the rotation of the optical element is determined as a lens manufacture residual-shape error, for each of the specified rotation angles of the optical element.

On the other hand, if the optical element has a particular angular symmetric weight-reducing structure at a rear side thereof, and the weight-reducing structure has a set of particular weight-reducing angles, e.g. 120 degrees, and if the supporting and holding unit 102b is maintained stationary with respect to the rotation of the optical element, if the plurality of aberration characteristics information has the constant amplitude deviation independent on one of the plurality of specified rotation angles corresponding thereto, the constant amplitude deviation is determined as a sum of the overall measurement system error and the holding error, and a sine wave or cosine wave having a period, e.g. 120 degree, associated with the set of weight-reducing angles from each of the plurality of aberration characteristics information is deducted, the amplitude difference in a remaining portion of each of the plurality of aberration characteristics information is determined as being resulted from the optical element gravity error.

If the holding element rotates with the optical element, and if each of the plurality of aberration information has a constant amplitude deviation independent on the plurality of specified rotation angles of the optical element, the constant amplitude deviation is determined as being resulted from the overall system measurement error, and the amplitude difference on a sine or cosine wave in each of the plurality of aberration characteristics information having a period associated with the set of particular weight-reducing angles is determined as being resulted from the optical element gravity error.

Finally, the holding error, the optical element gravity error, and the overall system measurement error from each of the plurality of aberration characteristics information are determined, and the amplitude difference of a remaining portion of each of the plurality of aberration characteristics information associated with the rotation of the optical element as the lens manufacture residual-shape error.

However, the above embodiment is made for only the case where the amplitude difference corresponding to the various errors are observed and their existence and their error amounts are analyzed. In fact, all the manners for this observation and analysis of the various errors by drawing the Zernike coefficients characteristics information function plots are considered as falling within the scope of the present invention. In addition, when the optic element is supported horizontal and vertically, the corresponding observations of the amplitude differences exist, respectively.

In what follows, the Zernike coefficients, the corresponding function and the corresponding measurement errors will be described in the simplest form, enabling those skilled in the art to appreciate them and deduce other cases associated therewith, and thus implement the present invention.

Figure 3A:
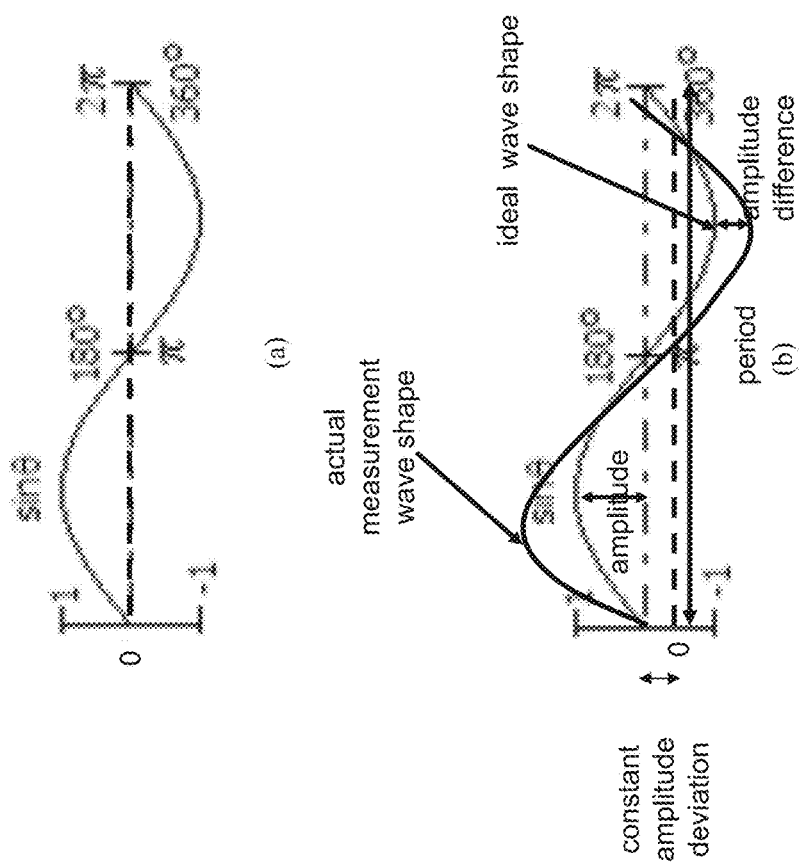
FIG. 3A and FIG. 3B are a schematic diagram for illustrating how a particular Zernike coefficient corresponds to a measurement error of one of aberrations.
Figure 3B:
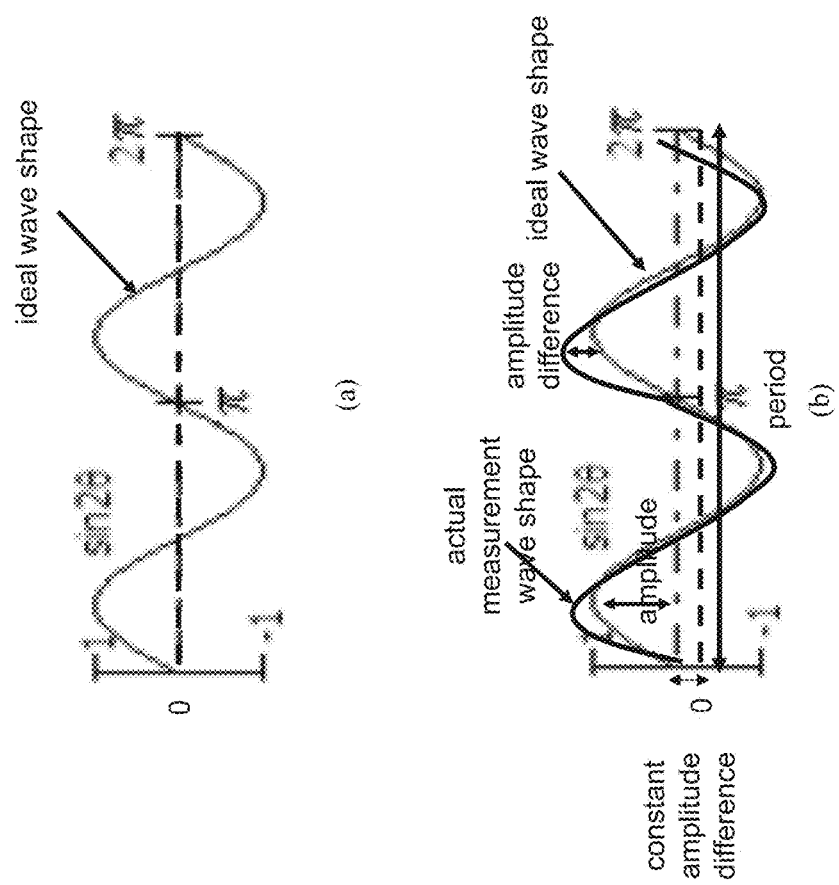

Now referring to FIG. 3A and FIG. 3B, which are a schematic diagram for illustrating how a particular Zernike coefficient corresponds to a measurement error of one of the aberrations, respectively.

In FIG. 3A, an ideal aberration characteristics function plot (a) associated with the $Z_3^{-1}$ level coma Zernike coefficient and a schematic aberration characteristics information function plot (b) corresponding thereto are shown, respectively. It may be known that the two function plots (a) and (b) are each a sine wave having a period of $2\pi$. It may be observed in figures. (a) and (b) that a constant amplitude difference is presented for all the rotation angles. At this time, it may be determined that an optical element gravity error or an overall system measurement error or a combination of them exists. In addition, a plurality of interference amounts, i.e. amplitude differences, are observed on the measured wave with respect to the ideal sine or cosine wave, it may be determined that a plurality of errors which may affect the measurement result.

In FIG. 3B, an ideal aberration characteristics function plot (a) associated with the $Z_2^{-2}$ level coma Zernike coefficient and a schematic aberration characteristics information function plot (b) corresponding thereto are shown, respectively. It may be known that the two function plots (a) and (b) are each a sine wave having a period of $\pi$. It may be observed in figures. (a) and (b) that a constant amplitude difference is presented for all the rotation angles. At this time, it may be determined that an optical element gravity error or an overall system measurement error or a combination of them exists. In addition, a plurality of interference amounts, i.e. amplitude differences, are observed on the measured wave with respect to the ideal sine or cosine wave, it may be determined that a plurality of errors which may affect the measurement result.

Furthermore, the present invention also provides a computer readable storage medium for executing a method for measuring an optic element, which are right the steps S201 to S206. The method executed in the computer readable storage medium has the same details as that of the method mentioned earlier, and thus the details are omitted herein for clarity.

Figure 4:
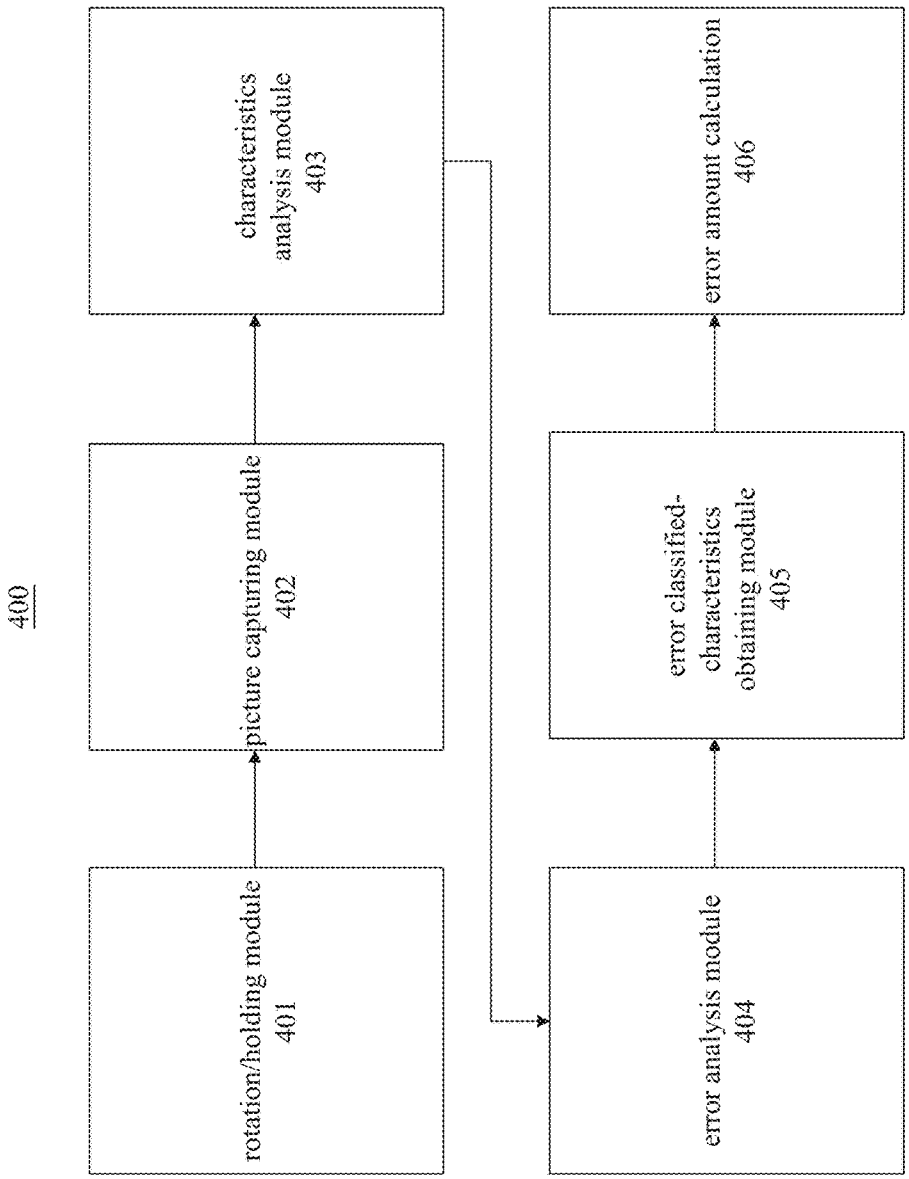
FIG. 4 is a systematic block diagram of an optical element according to the present invention.

Referring to FIG. 4, the apparatus for measuring an optical element for obtaining a plurality of measurement errors of the optical element is shown therein. The system comprises a rotation/holding module 401, a picture capturing module 402, a characteristics analysis module 403, an error analysis module 404, an error classified-characteristics obtaining module 405, and an error amount calculation module 406.

The rotation/holding module 401 is used to irradiate a laser ray on an entirety of the optical element, wherein the optical element is supported in a horizontal state or a vertical state.

The picture capturing module 402 is used to rotate continuously the optical element with 360 degrees to reflect the laser ray to obtain a reflected light wavefront picture from the reflected laser ray. The following modules 403 to 406 are all made for each of the plurality of specified rotation angles of the optical element.

The characteristics analysis module 403 is used to analyze the reflected light wavefront picture to obtain a plurality of aberration characteristics information, respectively, wherein each of the aberration characteristics information is a sine and a cosine wave functions of a wavefront error.

The error analysis module 404 is used to analyze a plurality of interference factors each for the plurality of measurement errors on each of the plurality of aberration characteristics information, respectively.

The error classified-characteristics obtaining module 405 is used to calculates and extract a plurality of classified aberration characteristics information from each of the plurality of aberration characteristics information according to the plurality of measurement errors, respectively, for each of the plurality of specified rotation angles of the optical element.

The error amount calculation module 406 is used to analyze each of the plurality of classified aberration characteristics information for each of the plurality of specified rotation angles of the optical element to obtain an error amount corresponding to each of the plurality of measurement errors, respectively.

The detailed description for the system of the present invention 400 may be referred to the detailed description made for the apparatus and method of the present invention, and thus omitted herein for clarity.

By means of the method, computer readable storage media, system, and apparatus for measuring an optical element, a holding error, an optical element gravity and a system error may be effectively separated and obtained, which may be then used to serve as a superior reference for a subsequent polishing and correction process of the optical element. This is an advantage of the present invention over the prior art.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A measuring method for an optical element, comprising steps of:
   (a) irradiating a laser ray to an entirety of the optical element, wherein the optical element is supported as one of a horizontal state and a vertical state;
   (b) rotating continuously the optical element with 360 degrees to reflect the laser ray to obtain a reflected light wavefront picture from the reflected laser ray for each of a plurality of specified rotation angles of the optical element;
   (c) analyzing the reflected light wavefront picture for each of a plurality of specified rotation angles of the optical element to obtain a plurality of aberration characteristics information, respectively, each being one of a sine and a cosine wave functions of a wavefront error for each of the plurality of specified rotation angles of the optical element;
   (d) comparing each of the plurality of aberration characteristics information with an ideal sine function and an ideal cosine function to obtain an amplitude difference and a constant amplitude deviation for each of the plurality of specified rotation angles of the optic element, wherein the amplitude difference and the constant amplitude deviation indicates that a measuring system error, an optic element gravity error, and a holding error are existed;

(e) extracting the measuring system error, the optic element gravity error, and the holding error from each of the plurality of aberration characteristics information to obtain a plurality of classified aberration characteristics information; and (f) analyzing each of the plurality of classified aberration characteristics information for each of the plurality of specified rotation angles of the optical element to obtain an error amount corresponding to the manufacture residual-shape error.

2. The method as claimed in claim 1, wherein the plurality of aberration characteristics information are various levels of Zernike coefficients.

3. The method as claimed in claim 2, wherein the step (d) further comprises steps of:

(1) when the optical element is an axial symmetric element, a supporting and holding unit for supporting and holding the optical element is fixed stationary with respect to a rotation of the optical element, and each of the aberration characteristics information has the constant amplitude deviation independent on one of the plurality of specified rotation angles corresponding thereto, determining the constant amplitude deviation as a sum of the measuring system error, the optic element gravity error, and the holding error for each of the specified rotation angles of the optical element;

(2) when the optical element is an axial symmetric element, the supporting and holding unit rotates with the supporting and holding unit, and the aberration characteristics information has the constant amplitude deviation independent on one of the plurality of specified rotation angles corresponding thereto, determining the amplitude difference is contributed from the measuring system error and the optic element gravity error for each of the specified rotation angles of the optical element; and when a sine wave or a cosine wave having a period equivalent to a plurality of holding angles of the holding unit holding the optical element exists in the ideal sine function and the ideal cosine function, determining the amplitude difference of the period of the sine wave or cosine wave is resulted from the holding error owing to the holding unit, for each of the specified rotation angles of the optical element; and (3) deducting the amplitude differences resulted from the holding error, the optical element gravity error, and the measuring system error from each of the plurality of aberration characteristics information, and determining the amplitude difference of a remaining portion of each of the plurality of aberration characteristics information associated with the rotation of the optical element as the manufacture residual-shape error, for each of the specified rotation angles of the optical element.

4. The method as claimed in claim 2, wherein the step (d) further comprises steps of:

(1) when the optical element has a particular angular symmetric weight-reducing structure at a rear side thereof, the weight-reducing structure has a set of particular weight-reducing angles, the supporting and holding unit is maintained stationary with respect to the rotation of the optical element, and the plurality of aberration characteristics information has the constant amplitude deviation independent on one of the plurality of specified rotation angles corresponding thereto, determining the constant amplitude deviation is a sum of the measuring system error and the holding error, deducting a sine wave or cosine wave having a period associated with the set of weight-reducing angles from each of the plurality of aberration characteristics information, and determining the amplitude difference in a remaining portion of each of the plurality of aberration characteristics information as being resulted from the optical element gravity error, for each of the specified rotation angles of the optical element;

(2) when the optical element has a particular angular symmetric weight-reducing structure at a rear side thereof, the weight-reducing structure has a set of particular weight-reducing angles, the holding element rotates with the optical element, and each of the plurality of aberration information has a constant amplitude deviation independent on the plurality of specified rotation angles of the optical element, determining the constant amplitude deviation is resulted from the measuring system error, and determining the amplitude difference on a sine or cosine wave in each of the plurality of aberration characteristics information having a period associated with the set of particular weight-reducing angles as being resulted from the optical element gravity error and the holding error, for each of the specified rotation angles of the optical element; and (3) deducting the holding error, the optical element gravity error, and the measuring system error from each of the plurality of aberration characteristics information, and determining the amplitude difference of a remaining portion of each of the plurality of aberration characteristics information associated with the rotation of the optical element as the manufacture residual-shape error, for each of the specified rotation angles of the optical element.

5. The method as claimed in claim 1, wherein the plurality of specified rotation angles of the optical element are 30 degrees, 60 degrees, 90 degrees, 120 degrees, 150 degrees, 180 degrees, 210 degrees, 240 degrees, 270 degrees, 300 degrees, 330 degrees, and 360 degrees.

6. A system for measuring an optical element, comprising:

a rotation/holding module, configured to irradiate a laser ray to an overall portion of the optical element, wherein the optical element is supported as one of a horizontal state and a vertical state;

a picture capturing module, configured to rotate continuously the optical element with 360 degrees to reflect the laser ray to obtain a reflected light wavefront picture from the reflected laser ray for each of a plurality of specified rotation angles of the optical element;

a characteristics analysis module, configured to analyze the reflected light wavefront picture for each of a plurality of specified rotation angles of the optical element to obtain a plurality of aberration characteristics information, respectively, each being one of a sine and a cosine wave functions of a wavefront error for each of the plurality of specified rotation angles of the optical element;

an error analysis module, configured to compare each of the plurality of aberration characteristics information with an ideal sine function and an ideal cosine function to obtain an amplitude difference and a constant amplitude deviation for each of the plurality of specified rotation angles of the optic element, wherein the amplitude difference and the constant amplitude deviation indicates that a measuring system error, an optic element gravity error, and a holding error are existed;

an error classified-characteristics obtaining module, configured to extract the measuring system error, the optic element gravity error, and the holding error from each of the plurality of aberration characteristics information to obtain a plurality of classified aberration characteristics information; and an error amount calculation module, configured to analyze each of the plurality of classified aberration characteristics information for each of the plurality of specified rotation angles of the optical element to obtain an error amount corresponding to the manufacture residual-shape error.

7. The system as claimed in claim 6, wherein the plurality of aberration characteristics information are various levels of Zernike coefficients.

8. The system as claimed in claim 6, wherein when the optical element is an axial symmetric element, a supporting and holding unit for supporting and holding the optical element is fixed stationary with respect to a rotation of the optical element, and each of the aberration characteristics information has the constant amplitude deviation independent on one of the plurality of specified rotation angles corresponding thereto, the error analysis module determines that the constant amplitude deviation as a sum of the measuring system error, the optic element gravity error, and the holding error for each of the specified rotation angles of the optical element;

when the optical element is an axial symmetric element, the supporting and holding unit rotates with the supporting and holding unit, and the aberration characteristics information has the constant amplitude deviation independent on one of the plurality of specified rotation angles corresponding thereto, the error analysis module determines the amplitude difference is contributed from the measuring system error and the optic element gravity error for each of the specified rotation angles of the optical element; and when a sine wave or a cosine wave having a period equivalent to a plurality of holding angles of the holding unit holding the optical element exists in the ideal sine function and the ideal cosine function, the error analysis module determines the amplitude difference of the period of the sine wave or cosine wave is resulted from the holding error owing to the holding unit, for each of the specified rotation angles of the optical element; and the error analysis module deducts the amplitude differences resulted from the holding error, the optical element gravity error, and the measuring system error from each of the plurality of aberration characteristics information, and the error analysis module determines the amplitude difference of a remaining portion of each of the plurality of aberration characteristics information associated with the rotation of the optical element as the manufacture residual-shape error, for each of the specified rotation angles of the optical element.

9. The system as claimed in claim 6, wherein the plurality of specified rotation angles of the optical element are 30 degrees, 60 degrees, 90 degrees, 120 degrees, 150 degrees, 180 degrees, 210 degrees, 240 degrees, 270 degrees, 300 degrees, 330 degrees, and 360 degrees.

10. The system as claimed in claim 6, wherein when the optical element has a particular angular symmetric weight-reducing structure at a rear side thereof, the weight-reducing structure has a set of particular weight-reducing angles, the supporting and holding unit is maintained stationary with respect to the rotation of the optical element, and the plurality of aberration characteristics information has the constant amplitude deviation independent on one of the plurality of specified rotation angles corresponding thereto, the error analysis module determines the constant amplitude deviation is a sum of the measuring system error and the holding error, deducts a sine wave or cosine wave having a period associated with the set of weight-reducing angles from each of the plurality of aberration characteristics information, and determines the amplitude difference in a remaining portion of each of the plurality of aberration characteristics information as being resulted from the optical element gravity error, for each of the specified rotation angles of the optical element;

when the optical element has a particular angular symmetric weight-reducing structure at a rear side thereof, the weight-reducing structure has a set of particular weight-reducing angles, the holding element rotates with the optical element, and each of the plurality of aberration information has a constant amplitude deviation independent on the plurality of specified rotation angles of the optical element, the error analysis module determines the constant amplitude deviation is resulted from the measuring system error, determines the amplitude difference on a sine or cosine wave in each of the plurality of aberration characteristics information having a period associated with the set of particular weight-reducing angles as being resulted from the optical element gravity error and the holding error, for each of the specified rotation angles of the optical element; and the error analysis module deducts the holding error, the optical element gravity error, and the measuring system error from each of the plurality of aberration characteristics information, and determining the amplitude difference of a remaining portion of each of the plurality of aberration characteristics information associated with the rotation of the optical element as the manufacture residual-shape error, for each of the specified rotation angles of the optical element.

* * * * *